(12) United States Patent
Namiki et al.

(10) Patent No.: US 6,278,005 B1
(45) Date of Patent: Aug. 21, 2001

(54) PROCESS OF PRODUCING SESAME LIGNANS AND/OR SESAME FLAVORS

(75) Inventors: Mitsuo Namiki, Aichi-ken; Takatsugu Kobayashi, Mie-ken; Hiroshi Hara, Aichi-ken, all of (JP)

(73) Assignee: Kabushikikaisha Fujimiyohoen, Saitama-Ken (JP)

( * ) Notice: Subject to any disclaimer, the term of this patent is extended or adjusted under 35 U.S.C. 154(b) by 0 days.

(21) Appl. No.: 09/541,369

(22) Filed: Mar. 31, 2000

(51) Int. Cl.$^7$ ............................................ C11B 5/00
(52) U.S. Cl. .................................... 554/11; 554/9
(58) Field of Search ................................ 554/9, 11

Primary Examiner—Deborah D. Carr
(74) Attorney, Agent, or Firm—Dilworth & Barrese LLP.

(57) ABSTRACT

A process of treating sesame oil to obtain sesame lignans and flavors contained in the oil in higher purity and yield is provided. In the process, the sesame oil is subjected to a supercritical extraction.

4 Claims, No Drawings

PROCESS OF PRODUCING SESAME LIGNANS AND/OR SESAME FLAVORS

FIELD OF THE INVENTION

The invention relates to a process of producing sesame lignans and/or sesame flavors.

BACKGROUND OF THE INVENTION

The seeds of sesame has been used as a food stuff in the world since several thousand years ago, and their nutritional values have been recognized for many years. In addition, scientific studies have been carried out for their functional utilities, and as a result, for sesame lignans which are ingrients particularly contained in the seeds, interesting unique functionalities have been found.

As sesame lignans there are sesamin, sesamolin, sesaminol and the like. Sesaminol is present in the seeds mainly as glygoside, and also can be produced from sesamolin.

The active oxygen produced in the body of human is toxic for human if its amount is in exess, and for instance, it is said that it may cause ageing, cancer, diabetes, Alzheimer disease and the like. To inhibit the active oxygen, it is necessary to take materials having antioxidative action and therefore the investigation searching for effective antioxidation materials has been effected.

The sesame lignans have this antioxidative effect, and especially sesaminol has the strongest effect and also sesamin has the similar effect.

The following has been known for sesamin. Sesamin can significantly inhibit the enzyme linked to the production of arachidonic acid (as the starting material linolic acid is used) which is a precursor of prostaglandins having physiological activites such as contraction and relaxation of smooth muscle, aggregation of blood platelet, inflammation etc. Further, sesamin prevents effectively liver disorder because it decomposes effectively ethanol in the liver. In addition, sesamin controls the increase of cholesterol while it decreases LDL cholesterol and is also effective for the lowering of blood pressure.

From the above, it is especially useful to obtain sesamin, sesaminol and sesamolin which can also produce sesaminol by transition from sesame seeds.

As the process of obtaining sesame oil from sesame seeds, mainly press process and extraction process with organic solvent (hexane is used)can be used. In the press process, the product still contains the oil whereas in the extraction process it may be difficult to eliminate completely the organic solvent residue in the extract.

The sesame lignans are contained in the sesame oil in an amount of about 1%. Generally it is very difficult to isolate a trace amount of oil-soluble active materials present in the oil. Thus, the previous processes to isolate the sesame lignans such as sesamin are, for example, one in which sesamin can be obtained from scum of byproduct recovered by the refinement of crude pressed sesame oil, and a process of obtaining sesame lignans by carrying out the molecular distillation of the scum has been proposed (JP10-120695A). In this process, the amount of the scum used as the starting material is limited, and the cost of the installation is high, and the treatment period is longer, and it is difficult to obtain the product in greater amount in view of the nature of the production plant. During the refining step of the starting crude press sesame oil, significant amount of sesamin is epimerized to episesamin. The physiological properties of the episesamin such as the inhibition activity of the enzyme linked to the production of arachidonic acid is lowered approximately half as much as those of sesamin. In this process, sesamolin is seldom isolated and the isolation of sesaminol is also difficult.

The inventors have previously found the process of treating sesame under supercritical extraction conditions to obtain sesame lilgnans and sesame flavor from sesame seeds. As a result, different from the prior processes, sesame lignans contained in the sesame seeds could be recovered in higher purity and yield, and also the flavors contained in the sesame seeds could be obtained.

In the previous process which the inventors had effected, the sesame lignans and flavors could be obtained in higher purity and yield comparing with the prior art processes, but as the starting material is sesame seeds, it is not convenient to recover the product sesame lignans and the production cost is much higher. In addition, since the product obtained in this process contains oily sesame lignans, it is necessary to use special treatment to obtain the sesame lignans in higher concentration or in solid state.

OBJECT OF THE INVENTION

An object of the invention is to provide a process to obtain the sesame lignans and flavors in higher purity and yield than the previous processes.

SUMMARY OF THE INVENTION

To attain the above object, in the invention sesame oil is treated under supercritical conditions instead of the sesame seeds.

In the field of the food manufacture, it is well known to obtain flavors, pigments and the like using supercritical extraction (see JP5-38270A, JP5-38271A, JP5-103625A, JP6-7109A, JP6-184591A, JP7-304976A, JP7-304977A, JP10-57010A). A process of obtaining highly refined fats and oils from the vegetable fats and oils by supercritical extraction is shown in JP6-136383A. The process shown in this publication relates to one which obtains highly refined fats and oils having reduced amout of free acid ingredients, odorants and phospholipids, but it does not relates to obtaining sesame lignans and/or sesame flavors.

The chief ingredient of scum produced during the de-odor step in the refining of crude sesame oil is triglyceride in which lignans are mixed. In the previous processes, the triglyceride is hydolyzed, methyl esterized and fractionated and then molecular distilled to recover the lignans. Thus, it was considered that the lignans could be obtained by effecting supercritical extraction of the scum, and the experiments were tried in vain.

DETAILED DESCRIPTION OF THE INVENTION

In the invention, sesame oil is treated under supercritical extraction conditions. Sesame oil used may be either the one obtained from sesame seeds roasted or the one obtained from unroasted seeds. Though sesame oil obtained by any extraction method from sesame seed can be employed, one obtained by a method except chemical treatment is preferred, and especially one obtained by supercritical extraction of sesame seed is most preferred.

As the conditions of supercritical extraction of the invention, for example, temperature is from 35 to 50° C., pressure is from 120 to 400 bar, preferably from 140 to 350 bar, and a solvent is $CO_2$, and water, ethyl alcohol and the like can be used as an entrainer. During the extraction, extracts having different components are produced with passage of time.

Further, in the invention, oil component having flavor is produced.

In the invention, due to the use of $CO_2$ as an extraction solvent, there is no risk of contamination of harmful substance comparing with the previous methods in which a solvent was used. In addition, since the method is carried out under almost non-oxygen condition and treatment temperature is near room temperature, the treated material is little oxidized or epimerized, so that the subject components can be obtained in higher yield without denaturation. The residue of extraction obtained is little influenced by oxygen, solvent and heat, and can be effectively used as salad oil etc.

In the invention, higher concentration of lignans is present in the product, and in some case, sesame lignans themselves can be crystallized out. Therefore, when sesame lignans are used commercially, they can be used as such without further treatment.

In the invention, preferred flavor of sesame can be extracted. Since the flavor of sesame has not been obtained, it can be said as the excellent advantage of the invention.

The invention is further described for illustrative purposes only in the following example which is in no way limiting of the invention itself.

EXAMPLE

Example 1

(A) Preliminary Experiment

Black sesame seeds roasted at a temperature of 160° C. for 15 minutes were placed into a supercritical extraction apparatus of maximum 380 atmospheric pressures. Using $CO_2$ as a solvent, the supercritical extraction was carried out at a temperature of 40° C. and under a pressure of 350 bar, Then, the isolation was done at a temperature of 40° C. and a pressure of 60 bar. Employing an oil which was obtained by substantial supercritical extraction (Table 1, L-1 and L-2) and an oil which was obtained by up to 20% of supercritical extraction (Table 1, L-3 and L-4), $CO_2$ as a solvent, a temperature of 40° C. and a pressure of 150 bar (Table 1, L-1 and L-3) or 300 bar (Table 1, L-2 and L-4), the supercritical extractions were effected. Subsecuently, the isolations were carried out at a temperature of 40° C. and a pressure of 60 bar.

At 20, 40, 60, 90 and 120 minutes after the start of the extractions, the extracts were recovered and the amounts extracted were determined. %lignan recoveries (value obtained from total amount of lignans in the extracts divided by total amount of lignans in the starting materials) of the extracts are 72.4% in L-2, 31.1% in L-3 and 85.3% in L-4, respectively. The result is shown in Table 1.

TABLE 1

| | Sample No. | | | |
|---|---|---|---|---|
| | L-1 | L-2 | L-3 | L-4 |
| Extraction pressure (Bar) | 150 | 300 | 150 | 300 |
| Wt. Starting material (kg) | 94.2 | 94.2 | 71.0 | 73.4 |
| Recovering time | Extract | Extract | Extract | Extract |
| (min) | kg  % | kg  % | kg  % | kg  % |
| 0–20 | 0.20  0.21 | 1.77  1.88 | 1.15  1.62 | 1.40  1.91 |
| 0–40 | 0.99  1.05 | 5.93  6.30 | 2.29  3.23 | 6.21  8.46 |
| 0–60 | 1.93  2.05 | 10.02  10.64 | 3.40  4.79 | 10.84  14.77 |
| 0–90 | 3.47  3.68 | 16.03  17.02 | 4.93  6.94 | 17.54  23.90 |
| 0–120 | 4.60  4.88 | 21.89  23.24 | 6.43  9.06 | 23.87  32.52 |
| Extract | 4.60  4.88 | 21.89  23.24 | 6.43  9.06 | 23.87  32.52 |
| Residue | 88.96  94.44 | 71.50  75.90 | 64.90  91.41 | 49.16  66.98 |
| Total | 93.56  99.32 | 93.39  99.14 | 71.33  100.46 | 73.03  99.50 |

From the result of Table 1, it is found that the amount of the oil is increased approximately linearly in the progress of time. (B) Based on the result of Table 1, using various types of sesame oil as starting material, the supercritical extraction was effected. As the starting materials were (I) 162.18 mL of so-called crude pressed white sesame oil which was obtained by pressing extraction from white brownish sesame seeds without roasting(containing 893.40 mg of sesamin and 691.99 mg of sesamolin), (II) 163.53 mL of roasted white sesame oil which was obtained by pressing extraction, precipitation and filtration from white brownish sesame seeds with roasting at 220° C. for 10 minutes(containing 1071.20 mg of sesamin and 774.97 mg of sesamolin), and (III) 169.90 mL of oil which was obtained by roasting black sesame seeds at 160° C. for 15 minutes (containing 999.57 mg of sesamin and 404.84 mg of sesamolin) were supercritically extracted using $CO_2$ as a solvent at a temperature of 40° C. and a pressure of 350 bar, and isolated at a temperature of 40° C. and a pressure of 60 bar.

In the supercritical extraction, all of the sesame oil above was extracted using $CO_2$ as a solvent at a temperature of 40° C. and a pressure of 300 bar, and then isolated at a temperature of 40° C. and a pressure of 60 bar.

After the start of the extraction, the extracted products were divided into fractions in the order of extraction time. %extraction was about 1.9% in the first fraction, about 4.5% in the second fraction, about 4.4% in the third fraction, about 6.4% in the fourth fraction and from about 5.5 to about 6.4% in the fifth fraction. The amounts of sesamin and sesamolin included in these fractions were determined, and because other lignans were little detected, those of sesamin and sesamolin were combined and assumed as the amount of lignan. In the extract, no episesamin could be found.

The result is shown in Table 2.

TABLE 2

| Fraction | Extracts | | Sesamin (A) | Sesamolin (B) | Lignan (A + B) | |
|---|---|---|---|---|---|---|
| No. | mL | % | Mg | mg | mg | % |
| (I) Crude pressed white sesame oil | | | | | | |
| 1 | 3.11 | 1.92 | 88.34 | 43.52 | 131.86 | 8.32 |
| 2 | 7.07 | 4.36 | 164.30 | 97.08 | 261.38 | 16.49 |
| 3 | 7.07 | 4.36 | 175.79 | 164.67 | 340.46 | 21.47 |
| 4 | 10.32 | 6.36 | 213.21 | 190.51 | 403.72 | 25.47 |
| 5 | 10.16 | 6.26 | 76.67 | 59.74 | 136.41 | 8.60 |
| Total of 1 to 5: (6) | 37.73 | 23.26 | 718.32 | 555.52 | 1273.83 | 80.35 |
| Residue: (7) | 119.46 | 73.66 | 117.47 | 83.43 | 200.90 | 12.67 |
| Total of (6) + (7) | 157.19 | 96.92 | 835.78 | 638.95 | 1474.73 | 93.02 |
| (II) Roasted white sesame oil | | | | | | |
| 1 | 3.14 | 1.92 | 85.73 | 37.09 | 122.82 | 6.65 |
| 2 | 7.35 | 4.49 | 110.77 | 88.86 | 199.63 | 10.81 |
| 3 | 7.10 | 4.34 | 123.28 | 72.18 | 195.46 | 10.59 |
| 4 | 10.32 | 6.31 | 128.93 | 79.18 | 208.11 | 11.27 |
| 5 | 9.05 | 5.53 | 73.53 | 43.62 | 117.15 | 6.35 |
| Total of 1 to 5: (6) | 36.96 | 22.60 | 522.24 | 320.93 | 843.17 | 45.67 |
| Residue: (7) | 123.51 | 75.53 | 341.84 | 204.09 | 545.93 | 29.57 |
| Total of (6) + (7) | 160.47 | 98.13 | 864.08 | 525.02 | 1889.10 | 75.24 |

TABLE 2-continued

| Fraction No. | Extracts mL | Extracts % | Sesamin (A) Mg | Sesamolin (B) mg | Lignan (A + B) mg | Lignan (A + B) % |
|---|---|---|---|---|---|---|
| (III) Roasted black sesame oil | | | | | | |
| 1 | 3.27 | 1.92 | 78.03 | 39.61 | 117.64 | 8.38 |
| 2 | 7.44 | 4.38 | 151.47 | 77.76 | 229.23 | 16.32 |
| 3 | 7.44 | 4.38 | 84.22 | 41.36 | 125.58 | 8.94 |
| 4 | 10.77 | 6.34 | 83.55 | 41.80 | 125.35 | 8.93 |
| 5 | 10.68 | 6.29 | 64.02 | 31.76 | 95.78 | 6.82 |
| Total of 1 to 5: (6) | 39.60 | 23.31 | 461.29 | 232.29 | 693.58 | 49.39 |
| Residue: (7) | 128.82 | 75.82 | 381.25 | 191.56 | 572.81 | 40.78 |
| Total of (6) + (7) | 168.42 | 99.13 | 842.54 | 423.85 | 1266.39 | 90.17 |

Since it is noted that the extracted oil is obtained linearly in the passage of time from the result of the preliminary experiment, from the result shown in Table (2), % extraction of lignan is higher than that of oil, so that the lignan is extracted first and thus there are much lignan in the extracted product. This can be understood that in (1) % extraction of the oil in the fractions from 1 to 5 is 23.7%, while that of the lignan is 86.37%.

On the other hand, as shown in Table 3, the flavor of the extract in accordance with the invention had good sesame flavor or sweet aroma, whereas that of the starting material had fishy or scorching smell. The color of the starting material was changed to lighter by the extraction.

TABLE 3

| | Flavor, color and properties |
|---|---|
| (I) Crude pressed white sesame oil | |
| Starting material Fraction | Yellow, fishy smell |
| 1 | Light yellow, crystals deposition |
| 2 | Light yellow, crystals deposition |
| 3 | Light yellow, crystals deposition |
| 4 | Light yellow, crystals deposition |
| 5 | no smell |
| Residue | Light yellow, no smell |
| (II) Roasted white sesame oil | |
| Starting material Fraction | Slightly dark reddish brown, sesame oil smell |
| 1 | Light reddish brown, a little small crystals deposition, flavorable sesame smell |
| 2 | Light reddish brown, clear, a little scorching smell |
| 3 | Light reddish brown, clear, a little scorching smell |
| 4 | |
| 5 | no sesame smell |
| Residue | Blackish brown, clear |
| (III) Roasted black sesame oil | |
| Starting material Fraction | |
| 1 | Light yellow, turbid, flavorable sesame smell, scorching smell |
| 2 | Very light yellow, clear partly crystals deposition |
| 3 | Very light yellow, clear, partly crystals deposition |
| 4 | Sweet aroma |
| 5 | Sweet aroma |
| Residue | Aroma having no scorching smell |

Further, for example, in the oil of white sesame without roasting the residue oil after the supercritical extraction was light yellow in color and had no smell. As no heat treatment was done, the residue lignans were not epimerized, and using as a salad oil, it was excellent qualitatively and healthfully.

What is claimed is:

1. A process of producing sesame lignans and/or sesame flavor which comprises subjecting sesame oil to a supercritical extraction.

2. A process according to claim 1, wherein the sesame lignans are sesamin and sesaminol.

3. A process according to claim 1, wherein the sesame oil used is obtained from roasted sesame seeds or unroasted sesame seeds.

4. A process according to claim 1, wherein the supercritical extraction is conducted at a temperature of from 35 to 50° C., and a pressure of from 120 to 400 bar, by using $CO_2$, water or ethyl alcohol as a solvent.

* * * * *